March 6, 1934.                C. P. TOWNSEND                1,950,072
                              EDUCATIONAL DEVICE
                              Filed Jan. 20, 1932
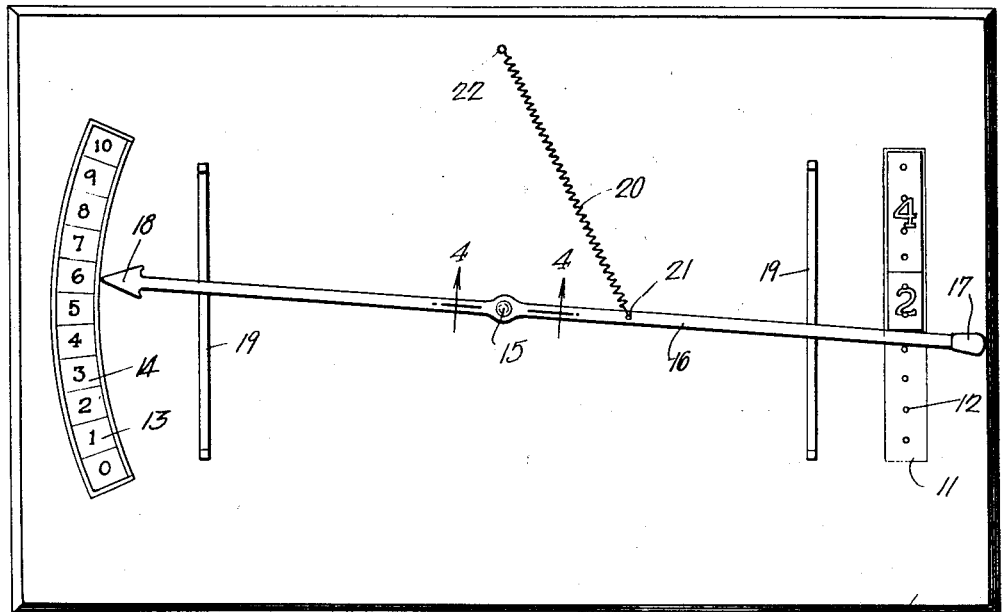
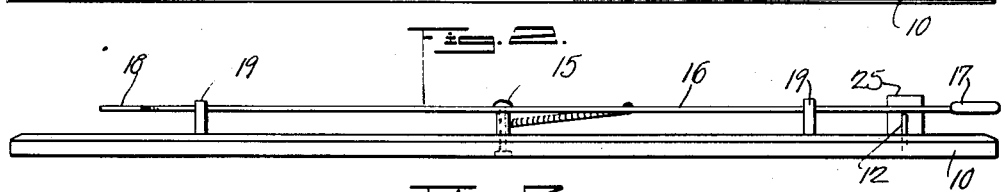
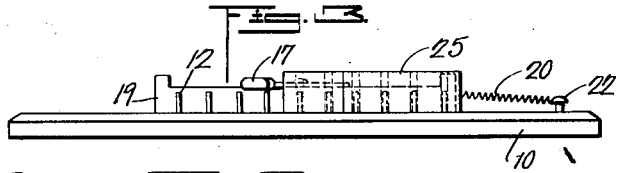
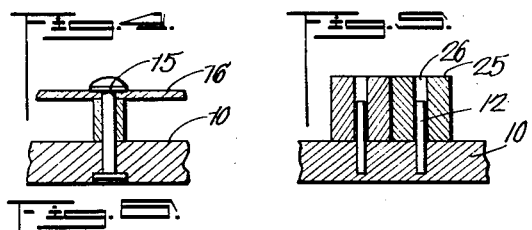
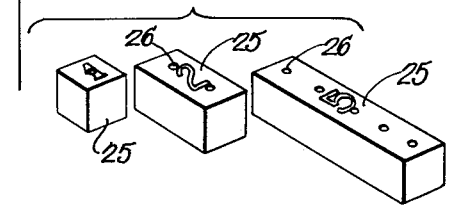
Inventor
C. POWELL TOWNSEND.
By Clarence A. O'Brien
                    Attorney Patented Mar. 6, 1934

1,950,072

UNITED STATES PATENT OFFICE 1,950,072

EDUCATIONAL DEVICE

Charles Powell Townsend, Yonkers, N. Y.

Application January 20, 1932, Serial No. 587,783

1 Claim. (Cl. 35—2)

This invention relates to educational devices and more particularly it pertains to such devices as are especially adapted for use in imparting to relatively young children, knowledge of an extremely primary nature.

It is the object of the invention to improve such devices and to provide a device which will be highly efficient for the purpose intended.

A feature of the invention resides in the provision of a device which may be operated to perform the so called basic number combinations in addition, multiplication, subtraction and division.

Another feature of the invention resides in the provision of a device which may be employed in word building and spelling.

A further feature of the invention resides in the novel arrangement and combination of elements whereby the pupil may prove such problems as he may attempt to solve.

Still a further feature of the invention resides in the provision of charts which are interchangeable and upon which the answers to arithmetical problems, or letter combinations may be visibly displayed.

Other novel features will present themselves as the description of the invention proceeds and the nature thereof is better understood.

Reference will be had to the accompanying drawing, in which;

Figure 1 is a view in elevation of an educational device constructed in accordance with one form of the present invention, Figure 2 is an edge view thereof, Figure 3 is an end view thereof, Figure 4 is a detail sectional view taken on the line 4—4 of Figure 1.

Figure 5 is a detail sectional view showing the pins and the manner in which the blocks are placed thereon, and Figure 6 is a perspective view illustrating certain blocks employed in connection with the device for the purpose of working out problems in arithmetic.

Referring more specifically to the drawing, the reference character 10 designates a base and this base may be carried or supported upon a table, desk, the floor of a classroom, or if desired may be suspended from the wall which latter position would probably be the more preferable.

The base 10 is preferably of rectangular form, and near one of its ends is provided with an area 11 within which a plurality of pins such as 12 are provided. These pins are preferably of circular cross sectional form and are arranged in equi- distantly spaced relation to each other as illustrated. Upon the opposite end of the base 10, there is a chart 13 and in this form of the invention in which the device is employed for problems in arithmetic, this chart consists of a plurality of relatively small areas 14 numbered from zero (0) to 10. Pivotally mounted as at 15 to a point substantially in the center of the base 10, there is an indicator or pointer 16. One end of this pointer is provided with a handle 17 and the other end 18 thereof moves adjacent the chart 13 heretofore mentioned. Suitable supports 19 may be employed upon which this pointer rests and which maintain the pointer in a true horizontal plane. A spring 20 is connected at one end as at 21 to the pointer and at its other end as at 22 to the base and this spring tends to maintain the pointer at all times in such position that its ends 18 will coincide with the zero area of the chart 13.

The reference numeral 25 designates a block of which there are a plurality employed. These blocks are of different lengths corresponding to their numerical value. That is to say, the block numbered 1 would be the shortest, the block numbered 2 would be twice the length of the block numbered 1 and the block numbered 5 will be five times the length of the block numbered 1 and this relative size of blocks is carried out throughout the entire set of which but three are shown in the drawing. Each of the blocks is provided with one or more openings 26 to receive the pins 12 and the number of openings which each block has corresponds directly to the value of the block.

This form of the invention operates in the following manner.

Two or more blocks 25 are positioned upon the pins 12. It will be noted that as the blocks are positioned upon the pins, the handle end of the pointer 16 is moved in order that this may be accomplished. After the blocks are positioned the handle end 17 of the pointer 16 is then released and under the influence of the spring 20, the handle end of the pointer will be moved into engagement with the adjacent block thus determining the extent of movement of the pointer 16.

By this arrangement of parts, the sum total of the blocks positioned upon the pins 12 will be indicated upon the chart 13 as for example the blocks having a value 4 and 2 respectively being placed upon the pins 12, the pointer 16 will be moved so that its end 18 will be adjacent the area designated 6 on the chart 13 and thus indicating that the sum total of the blocks 4 and 2 is 6.

If the problem is one of subtraction, the device is operated in the following manner:—Assuming that the problem consists of subtracting two from six. In performing such a problem, the end 18 of the pointer would be moved to position where it coincides with the numeral 6 on the chart. A block having the value of two is next placed upon the two pins adjacent the handle end of the pointer 16. The pins left uncovered are then counted to give the difference which will be the solution to the problem.

The chart 13 for addition and subtraction may be printed or otherwise formed directly on the base 10 but in the case of multiplication and division, specially prepared charts are employed and may serve as a mask for the chart 13 and secured thereto in any desired manner. In a discussion of a modified form of the invention, one means for maintaining these mask charts in position will be described.

In the solving of problems in multiplication and division, the device is operated in the same manner as described for problems in addition and subtraction, the chart being different in that it is specially prepared for these mathematical operations.

Having thus described the invention, what is claimed as new and what it is desired to secure by Letters Patent of the United States, is;

An educational device comprising in combination, a base, a pointer horizontally pivoted intermediate its ends on said base, resilient means for urging said pointer in one direction, block holding means arranged transversely of said base adjacent one end of said pointer, a plurality of blocks to be selectively and detachably held in position on said base by said block holding means in the path of movement of and engageable by the adjacent end of said pointer so as to hold said pointer in a predetermined position against the action of said resilient means, said blocks being of different lengths and having numerical valves relative to the lengths thereof, a chart on said base adjacent the opposite end of said pointer, said chart having a series of numerical designations extending transversely of said base and bearing a definite relation to the numerical values of said blocks whereby said pointer will indicate on said chart the combined numerical values of the blocks positioned on said base.

CHARLES POWELL TOWNSEND.